US012169665B1

(12) United States Patent
Schubert (10) Patent No.: US 12,169,665 B1
(45) Date of Patent: Dec. 17, 2024

(54) SCALAR LOSS FUNCTIONS FOR MULTIOBJECTIVE OPTIMIZATION (71) Applicant: X Development LLC, Mountain View, CA (US)

(72) Inventor: Martin Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 869 days.

(21) Appl. No.: 17/337,267

(22) Filed: Jun. 2, 2021

(51) Int. Cl.
*G06F 30/10* (2020.01)
*G06F 111/06* (2020.01)

(52) U.S. Cl.
CPC .......... *G06F 30/10* (2020.01); *G06F 2111/06* (2020.01)

(58) Field of Classification Search
CPC .............................. G06F 30/10; G06F 2111/06
See application file for complete search history.

(56) References Cited

PUBLICATIONS

Bhargava et al. "Multi-Objective Inverse Design of Sub-Wavelength Optical Focusing Structures for Heat Assisted Magnetic Recording" (Year: 2014).*
Kamal et al. "A Distance Based Method for Solving Multi-Objective Optimization Problems", Journal of Modern Applied Statistical Methods 17(1) Jul. 2018 (Year: 2018).*
Bader et al. "HypE: An Algorithm for Fast Hypervolume-Based Many-Objective Optimization", Massachusetts Institute of Technology 2011 (Year: 2011).*
Christiansen et al. "Inverse design in photonics by topology optimization: tutorial" vol. 38, No. 2, Feb. 2021, Journal of the Optical Society of America B (Year: 2021).*
Wang et al. "A New Approach to Target Region Based Multiobjective Evolutionary Algorithms", IEEE 2017 (Year: 2017).*
Handl, J., et al., "Multiobjectivization by decomposition of scalar cost functions", 10 pages.
Van Moffaert, K., et al., "Hypervolume-based Multi-Objective Reinforcement Learning", pp. 1-15.
Bader, J., et al., "HypE: An algorithm for fast hypervolume-based many-objective optimization", ETHzürich Research Collection, 2008, 26 pages.
J. Kivinen, et al., "Relative Loss Bounds for Multidimensional Regression Problems", Kluwer Academic Publishers, Machine Learning, 45, 2001, pp. 301-329.
Bhargava, S., et al., "Multi-objective inverse design of sub-wavelength optical focusing structures for heat assisted magnetic recording", NASA/ADS, Proceedings of the SPIE, vol. 9201, Aug. 31, 2014, 2 pp.

(Continued)

*Primary Examiner* — Rehana Perveen
*Assistant Examiner* — Troy A Maust
(74) *Attorney, Agent, or Firm* — Christensen O'Connor Johnson Kindness PLLC (57) ABSTRACT

In some embodiments, a method for creating a design for a physical device is provided. A computing system receives a design specification. The computing system generates a proposed design based on the design specification. The computing system determines a vector of loss values based on the proposed design. The computing system determines a scalar loss value based on a distance between the vector of loss values and a volume representing desired characteristics of the physical device. The computing system updates the proposed design based on the scalar loss value.

18 Claims, 3 Drawing Sheets

(56) References Cited

PUBLICATIONS

Fleischer, M., "The Measure of Pareto Optima: Applications to Multiobjective Metaheuristics", Technical Research Report, 22 pages.
"Multi-objective optimization", Wikipedia, The Free Encyclopedia, 19 pages.

* cited by examiner

SCALAR LOSS FUNCTIONS FOR MULTIOBJECTIVE OPTIMIZATION

TECHNICAL FIELD

This disclosure relates generally to designing and manufacturing physical devices, and in particular but not exclusively, relates to inverse design of optical and electromagnetic devices.

BACKGROUND

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these optoelectronic devices is sometimes determined through a simple guess and check method in which a small number of design parameters of a predetermined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Though some techniques for generating device designs exist, some of these techniques simply consider a single measure of performance while optimizing the device designs. A need exists for techniques that can consider more than one measure of performance during device design optimization.

BRIEF SUMMARY

In some embodiments, a non-transitory computer-readable medium having logic stored thereon is provided. The logic, in response to execution by one or more processors of a computing system, causes the computing system to perform actions for creating a design for a physical device. The actions include receiving, by the computing system, a design specification; generating, by the computing system, a proposed design based on the design specification; determining, by the computing system, a vector of loss values based on the proposed design; determining, by the computing system, a scalar loss value based on a Euclidean distance between the vector of loss values and a volume representing desired characteristics of the physical device; and updating, by the computing system, the proposed design based on the scalar loss value.

In some embodiments, a method for creating a design for a physical device is provided. A computing system receives a design specification. The computing system generates a proposed design based on the design specification. The computing system determines a vector of loss values based on the proposed design. The computing system determines a scalar loss value based on a distance between the vector of loss values and a volume representing desired characteristics of the physical device. The computing system updates the proposed design based on the scalar loss value.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1A:
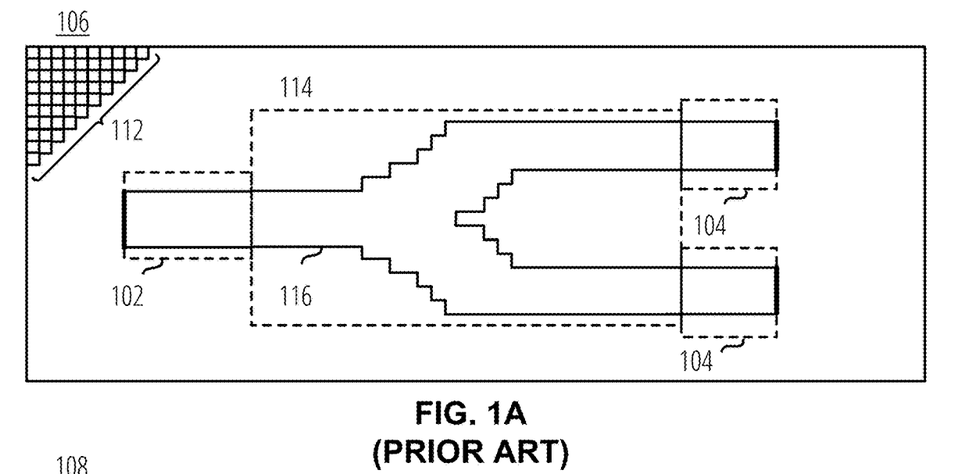
FIG. 1A illustrates a demonstrative simulated environment describing a photonic integrated circuit, in accordance with an embodiment of the present disclosure.
Figure 1B:
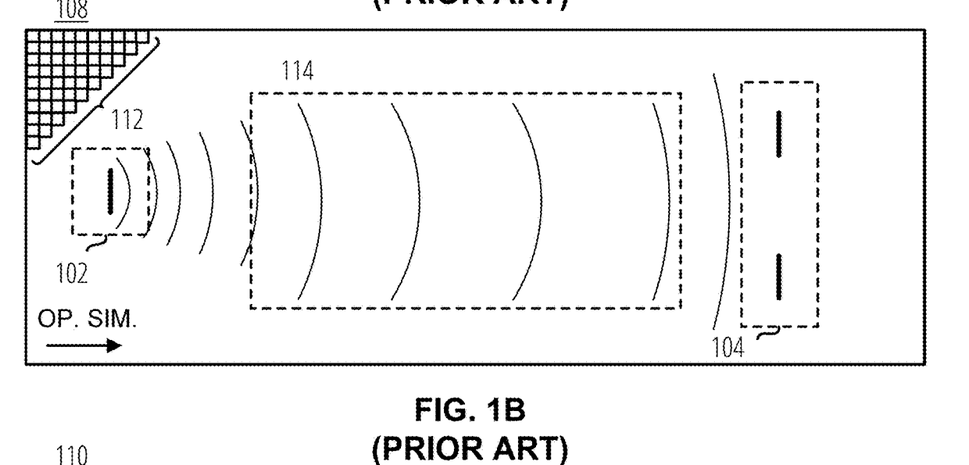
FIG. 1B illustrates an example operational simulation of a photonic integrated circuit, in accordance with an embodiment of the present disclosure.
Figure 1C:
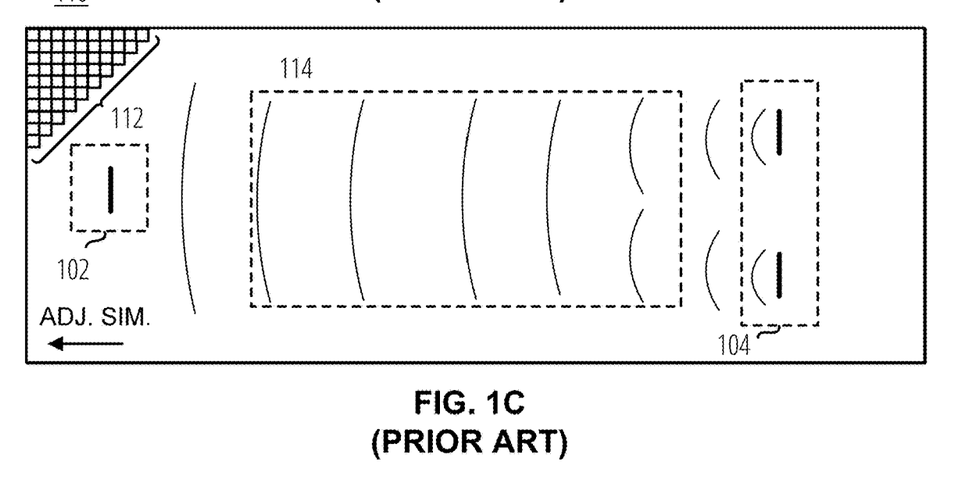
FIG. 1C illustrates an example adjoint simulation within the simulated environment by backpropagating a loss value, in accordance with an embodiment of the present disclosure.

FIG. 1A-FIG. 1C respectively illustrate an initial set up of a simulated environment describing a photonic device, performing an operational simulation of the photonic device in response to an excitation source within a simulated environment, and performing an adjoint simulation of the photonic device within a simulated environment. As illustrated in FIG. 1A-FIG. 1C, simulated environment is represented in two dimensions. However, it is appreciated that other dimensionality (e.g., 3-dimensional space) may also be used to describe simulated environment and the photonic device. In some embodiments, optimization of structural parameters of the photonic device illustrated in FIG. 1A-FIG. 1C may be achieved via an inverse design process including, inter alia, simulations (e.g., operational simulations and adjoint simulations) that utilize a finite-difference time-domain (FDTD) method, a finite-difference frequency-domain (FDFD) method, or other computational EM methods to model the field response (e.g., electric and magnetic field) to an excitation source.

FIG. 1A illustrates a demonstrative simulated environment 106 describing a photonic integrated circuit (i.e., a photonic device such as a waveguide, demultiplexer, and the like), in accordance with an embodiment of the present disclosure. More specifically, in response to receiving an initial description of a photonic device defined by one or more structural parameters (e.g., an input design), a system configures a simulated environment 106 to be representative of the photonic device. As illustrated, the simulated environment 106 (and subsequently the photonic device) is described by a plurality of segments 112, which represent individual elements (i.e., discretized) of the two-dimensional (or other dimensionality) space. Each of the segments 112 is illustrated as two-dimensional squares; however, it is appreciated that the segments may be represented as cubes or other shapes in three-dimensional space. It is appreciated that the specific shape and dimensionality of the plurality of segments 112 may be adjusted depending on the simulated environment 106 and photonic device (or other physical device) being simulated. It is further noted that only a portion of the plurality of segments 112 are illustrated to avoid obscuring other aspects of the simulated environment 106.

Each of the plurality of segments 112 may be associated with a structural value, a field value, and a source value. Collectively, the structural values of the simulated environment 106 describe the structural parameters of the photonic device. In one embodiment, the structural values may correspond to a relative permittivity, permeability, and/or refractive index that collectively describe structural (i.e., material) boundaries or interfaces of the photonic device. For example, an interface 116 is representative of where relative permittivity changes within the simulated environment 106 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of segments 112. Thus, the field response may be based, at least in part, on the structural parameters of the photonic device and the excitation source.

In the illustrated embodiment, the photonic device corresponds to an optical demultiplexer having a design region 114, in which structural parameters of the physical device may be updated or otherwise revised. More specifically, through an inverse design process, iterative gradient-based optimization of a loss metric determined from a loss function is performed to generate a design of the photonic device that functionally causes a multi-channel optical signal to be demultiplexed and guided from input port 102 to a corresponding one of the output ports 104. Thus, input port 102 of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 106). In other words, the excitation source may cause the field response of the photonic device to change, which is dependent on the underlying physics governing the physical domain and the structural parameters of the photonic device. The excitation source originates or is otherwise proximate to input port 102 and is positioned to propagate (or otherwise influence the field values of the plurality of segment) through the design region 114 towards output ports 104 of the photonic device. In the illustrated embodiment, the input port 102 and output ports 104 are positioned outside of the design region 114. In other words, in the illustrated embodiment, only a portion of the structural parameters of the photonic device is optimizable.

However, in other embodiments, the entirety of the photonic device may be placed within the design region 114 such that the structural parameters may represent any portion or the entirety of the design of the photonic device. The electric and magnetic fields within the simulated environment 106 (and subsequently the photonic device) may change (e.g., represented by field values of the individual segment that collectively correspond to the field response of the simulated environment) in response to the excitation source. The output ports 104 of the optical demultiplexer may be used for determining a performance metric of the photonic device in response to the excitation source (e.g., power transmission from input port 102 to a specific one of the output ports 104). The initial description of the photonic device, including initial structural parameters, excitation source, performance parameters or metrics, and other parameters describing the photonic device, may be received by a system and used to configure the simulated environment 106 for performing a first-principles based simulation of the photonic device. These specific values and parameters may be defined directly by a user, indirectly (e.g., by a system culling pre-determined values stored in a memory, local storage, or remote resources), or a combination thereof.

FIG. 1B illustrates an operational simulation of the photonic device in response to an excitation source within simulated environment 108, in accordance with various aspects of the present disclosure. In the illustrated embodiment, the photonic device is an optical demultiplexer structured to optically separate each of a plurality of distinct wavelength channels included in a multi-channel optical signal received at input port 102 and respectively guide each of the plurality of distinct wavelength channels to a corresponding one of the plurality of output ports 104. The excitation source may be selected (randomly or otherwise) from the plurality of distinct wavelength channels and originates at input port 102 having a specified spatial, phase, and/or temporal profile. The operational simulation occurs over a plurality of time steps, including the illustrated time step. When performing the operational simulation, changes to the field response (e.g., the field value) for each of the plurality of segments 112 are incrementally updated in response to the excitation source over the plurality of time steps. The changes in the field response at a particular time step are based, at least in part, on the structural parameters, the excitation source, and the field response of the simulated environment 110 at the immediately prior time step included in the plurality of time steps. Similarly, in some embodiments the source value of the plurality of segments 112 is updated (e.g., based on the spatial profile and/or temporal profile describing the excitation source). It is appreciated that the operational simulation is incremental and that the field values (and source values) of the simulated environment 110 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In some embodiments, the performance metric corresponds to the power transmission at a corresponding one of the output ports 104 mapped to the distinct wavelength channel being simulated by the excitation source. In other words, in some embodiments, the performance metric represents power (at one or more frequencies of interest) in the target mode shape at the specific locations of the output ports 104. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on loss metric) for updating or otherwise revising the structural parameters to reduce the loss metric (i.e. increase the performance metric).

FIG. 1C illustrates an example adjoint simulation within simulated environment 110 by backpropagating a loss metric, in accordance with various aspects of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 104) or other location that corresponds to a location used when determining the performance metric. The adjoint source(s) is then treated as a physical stimuli or an excitation source during the adjoint simulation. A loss response of the simulated environment 110 is computed for each of the plurality of time steps (e.g., backwards in time) in response to the adjoint source. The loss response collectively refers to loss values of the plurality of segments that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range such that the photonic device provides the desired performance while maintaining fabricability.

Figure 2:
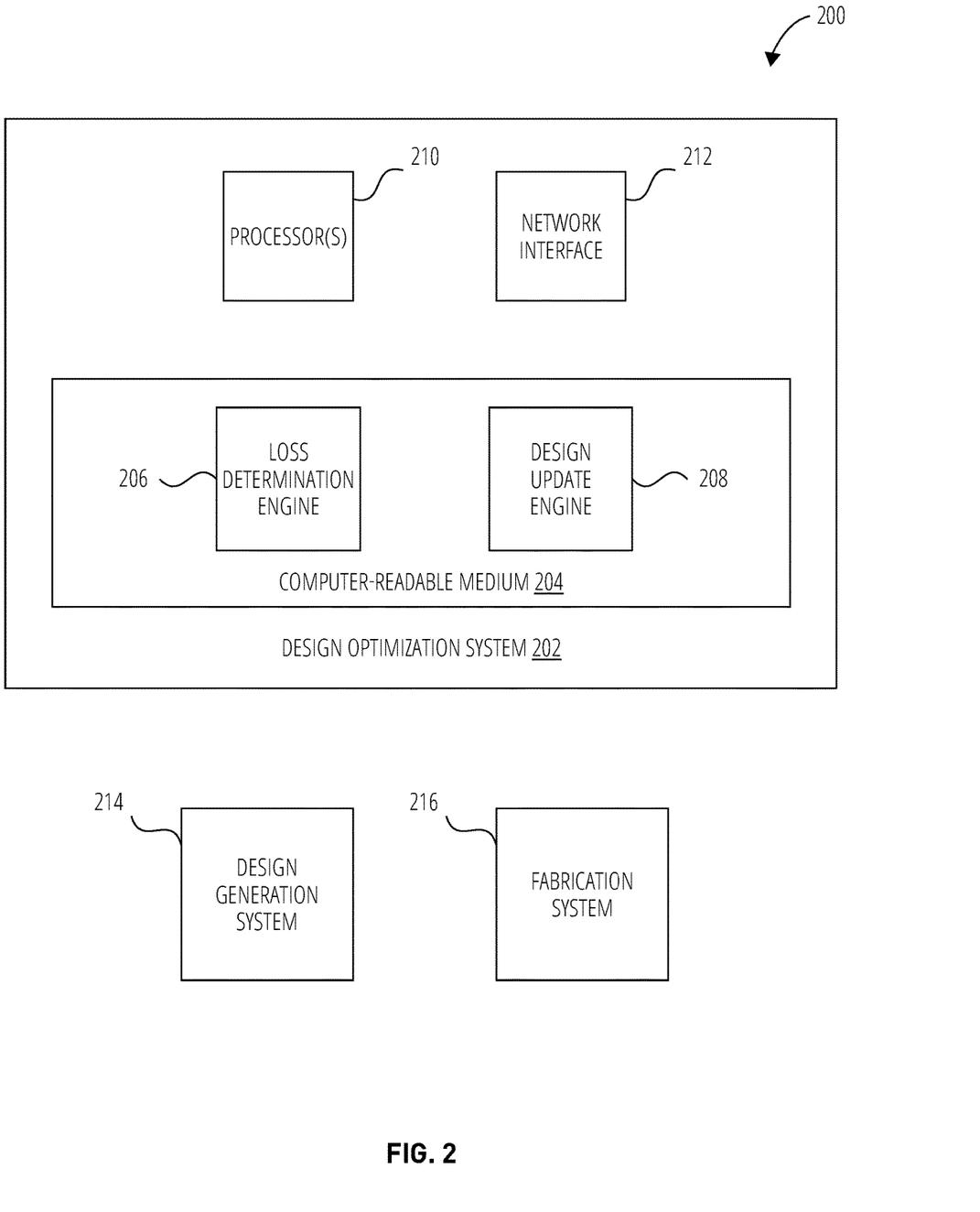
FIG. 2 is a block diagram that illustrates a non-limiting example embodiment of a system according to various aspects of the present disclosure.

FIG. 2 is a block diagram that illustrates a non-limiting example embodiment of a system according to various aspects of the present disclosure. Overall, the illustrated embodiment of the system 200 is configured to generate proposed designs, to optimize the proposed designs, and to fabricate physical devices based on the proposed designs.

As shown, the system 200 includes a design generation system 214, a fabrication system 216, and a design optimization system 202. Communication between the design generation system 214, the design optimization system 202, and the fabrication system 216 may occur via a network (not pictured), via exchange of a removable computer-readable medium (not pictured), or via any other suitable technique. Though the design generation system 214, fabrication system 216, and design optimization system 202 are illustrated as separate systems, in some embodiments, some portions of these systems may be combined. As one non-limiting example, the design generation system 214 and the design optimization system 202 may be combined in a single system. Also, in some embodiments, systems illustrated in FIG. 2 as a single system may be broken into multiple systems.

In some embodiments, the design generation system 214 may include one or more computing devices that are configured to generate design specifications or proposed designs for physical devices that achieve a desired result. For example, the design generation system 214 may provide a user interface for receiving input that indicates desired characteristics for a physical device, that the design generation system 214 may then incorporate into a design specification or a proposed design. This is a non-limiting example only, and any other technique, including but not limited to automated generation of design specifications or proposed designs, may be used by the design generation system 214 to create design specifications or proposed designs.

In some embodiments, the fabrication system 216 may be any suitable system for fabricating a physical device. In some embodiments, the fabrication system 216 may be a photolithography system or an additive manufacturing system. In some embodiments, the fabrication system 216 may have characteristics that include a minimum feature size, a minimum feature shape, and/or other constraints that help define the proposed design that the fabrication system 216 is capable of fabricating that may be considered by the design optimization system 202 in determining one or more loss metrics.

In some embodiments, the design optimization system 202 may be any suitable computing device or collection of computing devices configured to provide the described functionality. In some embodiments, the design optimization system 202 may be a server computing device, a desktop computing device, a laptop computing device, a mobile computing device, a tablet computing device, or one or more computing devices of a cloud computing system.

As shown, the design optimization system 202 includes one or more processors 210, a network interface 212, and a computer-readable medium 204. In some embodiments, the one or more processors 210 may include a plurality of processors and/or a plurality of processing cores in order to provide a large amount of computing power. In some embodiments, the network interface 212 may be configured to communicate with the design generation system 214 and/or the fabrication system 216 via any suitable type of wired network (including but not limited to Ethernet, FireWire, and USB), wireless network (including but not limited to 2G, 3G, 4G, 5G, LTE, Wi-Fi, WiMAX, and Bluetooth), or combinations thereof. In some embodiments, instead of a network interface 212, the design optimization system 202 may be configured to communicate with the design generation system 214 and/or the fabrication system 216 via transfer of a removable computer-readable medium (not shown).

As shown, the computer-readable medium 204 has stored thereon logic that, in response to execution by the one or more processors 210, cause the design optimization system 202 to provide a loss determination engine 206 and a design update engine 208.

In some embodiments, the loss determination engine 206 is configured to simulate performance of a physical device represented by a proposed design, and to measure performance of the simulated physical device against a plurality of desired characteristics. The loss determination engine 206 is then configured to determine a loss value that represents an overall combined loss that may be differentiated in order to optimize the proposed design with respect to the plurality of desired characteristics concurrently. In some embodiments, the design update engine 208 is configured to modify proposed designs using the gradient of the loss value determined by the loss determination engine 206. Further details of the operations of these components are provided below.

As used herein, "engine" refers to logic embodied in hardware or software instructions, which can be written in a programming language, such as C, C++, C#, COBOL, JAVA™, PHP, Perl, HTML, CSS, JavaScript, VBScript, ASPX, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage. A computer-readable medium may also include multiple devices configured to collectively store the information described.

Typically, inverse design processes for physical devices are limited in that they are only capable of optimizing for a single loss metric at a time. In embodiments of the present disclosure, techniques are used to combine multiple different loss metrics into a single scalar loss value that is differentiable and can therefore be used to provide a gradient that can consider all of the different loss metrics concurrently during optimization. This allows inverse design of a greater number of potential physical devices, including but not limited to photonic devices that have multiple input and/or output ports that each have their own performance specifications to meet.

Figure 3:
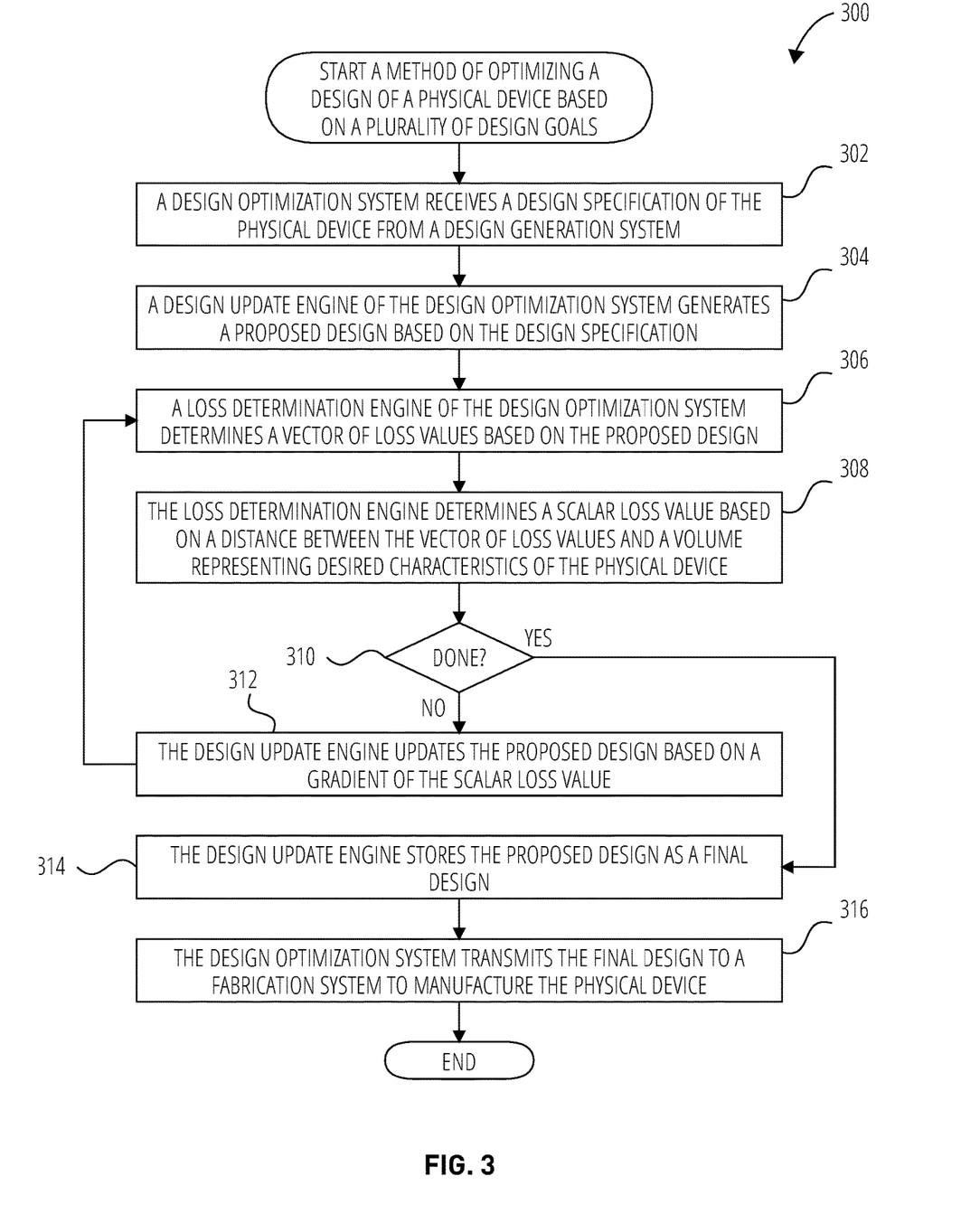
FIG. 3 is a flowchart that illustrates a non-limiting example embodiment of a method of optimizing a design of a physical device based on a plurality of design goals according to various aspects of the present disclosure.

FIG. 3 is a flowchart that illustrates a non-limiting example embodiment of a method of optimizing a design of a physical device based on a plurality of design goals according to various aspects of the present disclosure. In the method 300, the design optimization system 202 determines a scalar loss value based on multiple desired characteristics of the physical device, and uses the scalar loss value to improve the design of the physical device with respect to all of the desired characteristics concurrently.

From a start block, the method 300 proceeds to block 302, where a design optimization system 202 receives a design specification of the physical device from a design generation system 214. In some embodiments, the design specification may include specifications of physical structures for the physical device generated randomly, generated using a naïve optimization technique, generated manually, or generated using any other suitable technique. In some embodiments, the design specification may include a linear function that represents one or more desired characteristics instead of specifying specifications of physical structures.

In some embodiments, the design specification may also include indications of the desired characteristics of the physical device. For example, the design specification may include one or more performance loss functions to be used to evaluate various aspects of performance of the physical device during optimization. As another example, the design specification may include a plurality of parameters, including but not limited to desired input and/or output wavelengths, insertion loss at a given input port or output port, rejection at a given input port or output port, reflection at a given input port or output port, and so on, to be used by a performance loss function built into the loss determination engine 206.

In one non-limiting example, the plurality of parameters for a wavelength demultiplexer may include prescribed reflection, insertion, and rejection powers, e.g., $$|S_{1,1}^\omega|^2 \le |S_{1,1}^\omega|_{max}^2 = -40 \text{ dB} \quad \omega \in \Omega_2 \cup \Omega_3 \cup \ldots \cup \Omega_{n+1}$$

$$|S_{k,1}^\omega|^2 \ge |S_{k,1}^\omega|_{min}^2 = -3 \text{ dB} \quad \omega \in \Omega_k, k = 2, 3, \ldots, n+1$$

$$|S_{k,1}^\omega|^2 \le |S_{k,1}^\omega|_{max}^2 = -30 \text{ dB}, \quad \omega \notin \Omega_k, k = 2, 3, \ldots, n+1$$

Here, ω is an index over the frequencies at which conformance to the specification is evaluated, and $\Omega_k$ contains the frequencies intended for the k-th port, that is, the k−1th output port. To generalize the notion of such parameters provided in a design specification, the groupings of frequencies may be dropped into the $\Omega_k$, and instead the vector s may be defined as the flattened power S-parameters, as follows:

$$s = [|S_{1,1}^{\omega_1}|^2, \ldots, |S_{n+1,1}^{\omega_1}|^2, |S_{1,1}^{\omega_2}|^2, \ldots, |S_{n+1,1}^{\omega_m}|^2]^T$$

With this definition, the wavelength demultiplexer specification given above can simply be written as:

$$As \le b$$

with A being square and having only one nonzero element power row. This defines a volume in multi-dimensional space that represents acceptable performance of the physical device. By using this formulation and with a rectangular A, it is also possible to capture more sophisticated requirements such as ripple. Further, device types such as power splitters, multiplexers, mode converters, or even multi-mode to many-single-mode couplers can be represented. For example, the volume can be described by linear inequality constraints such as:

$$lb \le A \cdot s \le ub$$

where the length of the vector s matches the number of performance characteristics measured for the design, the matrix A has a number of rows that matches a number of constraints and a number of columns that matches the length of the vector s, and ub and lb are vectors of a length that matches the number of constraints. Complex constraints may then be specified by providing non-zero values for more than one element in a row. Consider, for example, the following A:

$$A = \begin{bmatrix} 1 & 0 & 0 & 0 \\ 0 & 1 & 0 & 0 \\ 0 & 0 & 1 & 0 \\ 0 & 0 & 0 & 1 \\ 1 & -1 & 0 & 0 \end{bmatrix}$$

This specifies that a first characteristic, a second characteristic, a third characteristic, and a fourth characteristic are between a first lower bound/first upper bound, a second lower bound/second upper bound, a third lower bound/third upper bound, and a fourth lower bound/fourth upper bound, respectively. It also specifies that the first characteristic minus the second characteristic is between a fifth lower bound/fifth upper bound. By providing such constraints, interdependencies between the characteristics can be modeled in A.

At block 304, a design update engine 208 of the design optimization system 202 generates a proposed design based on the design specification. Any suitable technique may be used by the design update engine 208 to generate the proposed design based on the design specification. As one non-limiting example, the forward simulation/backpropagation technique described above in FIG. 1A-FIG. 1C may be used to create a proposed design based on the design specification. In other examples, other techniques, including but not limited to other generative design techniques, genetic design techniques, or still other techniques may be used.

At block 306, a loss determination engine 206 of the design optimization system 202 determines a vector of loss values based on the proposed design. As stated above, the design specification may indicate a plurality of parameters that indicate desired characteristics of the physical device. In some embodiments, the loss determination engine 206 may simulate performance of the proposed design, and measure the simulated performance with respect to each parameter. The performance with respect to each parameter, or a difference between the performance with respect to each parameter and desired characteristics for each parameter, may be combined to create the vector of loss values. The vector of loss values thereby represents performance of the proposed design in the multidimensional space.

At block 308, the loss determination engine 206 determines a scalar loss value based on a distance between the vector of loss values and a volume representing desired characteristics of the physical device. As discussed above, the vector of loss values represents performance of the proposed design in a multidimensional space, and the desired characteristics of the physical device are represented by a volume within the multidimensional space. In some embodiments, a distance between this volume and the point represented by the vector of loss values may be used as the scalar loss value. The computation of this distance is, itself, an optimization problem, but this distance is differentiable, thus allowing a gradient of the distance to be determined and used for optimization.

In some embodiments, a scalar loss value that penalizes the Euclidean distance to compliance with the desired characteristics in power S-parameter space may be used. Finding the closest space within the volume representing the desired characteristics and the vector loss values involves solving a quadratic programing problem, where the distance is the objective and the specification constitutes the linear constraints. This loss may be given by:

$$L = \|s - s_{nearest}\|^2$$

where $$s_{nearest} = \mathrm{argmin}_{s'} \|s - s'\|^2$$

s.t. $As' \leq b$

This specific scalar loss value may be appropriate if the desired characteristics are provided on a linear scale. If the desired characteristics are provided on a logarithmic scale (such as dB), the loss may be given by:

$$10 \log_{10} s_{nearest} = x_{nearest} = \mathrm{argmin}_x \|s - 10^{x/10}\|^2$$

s.t. $Ax \leq b$

This optimization problem may be solved using any suitable technique. For example, in some embodiments, the optimization problem may be solved using a trust-region interior point technique, such as (but not limited to) the 'trust-constr' technique implemented by 'scipy.optimize.minimize'.

The method 300 then proceeds to a decision block 310, where a determination is made regarding whether the method 300 is done optimizing the proposed design. In some embodiments, the method 300 may perform a fixed number of optimization iterations, and the determination may be made based on whether the fixed number of optimizations has been performed yet. In some embodiments, the method 300 may check to see whether the scalar loss value indicates a location within the multidimensional volume that represents the desired characteristics, and the determination may be made based on whether the scalar loss value is inside, outside, or touching the multidimensional volume. In some embodiments, being inside or touching the multidimensional volume may cause the result of decision block 310 to be YES. In other embodiments, being inside or touching the multidimensional volume being inside or touching the multidimensional volume may merely cause the loss determination engine 206 to use a different scalar loss value while a fixed number of optimization iterations is conducted. For example, once inside or touching the multidimensional volume, the loss determination engine 206 may use a scalar loss value based on a Euclidean distance between the vector of loss values and a centroid of the multidimensional volume.

If the method 300 is not done optimizing the proposed design, then the result of decision block 310 is NO, and the method 300 proceeds to block 312. At block 312, the design update engine 208 updates the proposed design based on a gradient of the scalar loss value.

The method 300 then returns to block 306 to perform a subsequent iteration of the optimization technique.

Returning to decision block 310, if the method 300 is done optimizing the proposed design, then the result of decision block 310 is YES, and the method 300 proceeds to block 314, where the design update engine 208 stores the proposed design as a final design, and to block 316, where the design optimization system 202 transmits the final design to a fabrication system 216 to manufacture the physical device.

The method 300 then proceeds to an end block and terminates.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, causes the computing system to perform actions for creating a design for a physical device, the actions comprising:
   receiving, by the computing system, a design specification;
   generating, by the computing system, a proposed design based on the design specification;
   determining, by the computing system, a vector of loss values based on the proposed design;
   determining, by the computing system, a scalar loss value based on a Euclidean distance between the vector of loss values and a volume representing desired characteristics of the physical device;
   updating, by the computing system, the proposed design based on the scalar loss value; and
   transmitting, by the computing system, the proposed design to a fabrication system to fabricate the physical device.

2. The non-transitory computer-readable medium of claim 1, wherein updating the proposed design based on the scalar loss value includes updating the proposed design based on a gradient of the scalar loss value.

3. The non-transitory computer-readable medium of claim 1, wherein loss values of the vector of loss values and the desired characteristics are specified on a linear scale, and wherein determining the scalar loss value based on the distance between the vector of loss values and the volume representing desired characteristics of the physical device includes solving a quadratic programming problem, wherein the distance is an objective of the quadratic programming problem and the volume representing desired characteristics of the physical device constitutes linear constraints of the quadratic programming problem.

4. The non-transitory computer-readable medium of claim 1, wherein determining the scalar loss value includes multiplying the vector of loss values by a matrix associated with the volume.

5. The non-transitory computer-readable medium of claim 4, wherein the matrix has a number of rows that matches a number of constraints and has a number of columns that matches a length of the vector of loss values.

6. The non-transitory computer-readable medium of claim 1, wherein the actions further comprise repeating the determining of the vector of loss values, the determining the scalar loss value, and the updating the proposed design based on the scalar loss value at least until the scalar loss value reaches the volume representing the desired characteristics of the physical device.

7. The non-transitory computer-readable medium of claim 6, wherein the actions further comprise continuing to repeat the determining of the vector of loss values, the determining the scalar loss value, and the updating the proposed design based on the scalar loss value for at least one iteration after the scalar loss value reaches the volume representing the desired characteristics of the physical device.

8. The non-transitory computer-readable medium of claim 1, wherein the physical device is an optoelectronic device.

9. The non-transitory computer-readable medium of claim 8, wherein the optoelectronic device is a wavelength demultiplexer, a wavelength multiplexer, a power splitter, a mode converter, a multi-mode interference coupler, or a many-single-mode coupler.

10. A method for creating a design for a physical device, the actions comprising:
    receiving, by a computing system, a design specification;
    generating, by the computing system, a proposed design based on the design specification;
    determining, by the computing system, a vector of loss values based on the proposed design;
    determining, by the computing system, a scalar loss value based on a distance between the vector of loss values and a volume representing desired characteristics of the physical device;
    updating, by the computing system, the proposed design based on the scalar loss value; and
    transmitting, by the computing system, the proposed design to a fabrication system to fabricate the physical device.

11. The method of claim 10, wherein updating the proposed design based on the scalar loss value includes updating the proposed design based on a gradient of the scalar loss value.

12. The method of claim 10, wherein loss values of the vector of loss values and the desired characteristics are specified on a linear scale, and wherein determining the scalar loss value based on the distance between the vector of loss values and the volume representing desired characteristics of the physical device includes solving a quadratic programming problem, wherein the distance is an objective of the quadratic programming problem and the volume representing desired characteristics of the physical device constitutes linear constraints of the quadratic programming problem.

13. The method of claim 10, wherein determining the scalar loss value includes multiplying the vector of loss values by a matrix associated with the volume.

14. The method of claim 10, wherein the matrix has a number of rows that matches a number of constraints and has a number of columns that matches a length of the vector of loss values.

15. The method of claim 10, further comprising repeating the determining of the vector of loss values, the determining the scalar loss value, and the updating the proposed design based on the scalar loss value at least until the scalar loss value reaches the volume representing the desired characteristics of the physical device.

16. The method of claim 15, further comprising continuing to repeat the determining of the vector of loss values, the determining the scalar loss value, and the updating the proposed design based on the scalar loss value for at least one iteration after the scalar loss value reaches the volume representing the desired characteristics of the physical device.

17. The method of claim 10, wherein the physical device is an optoelectronic device.

18. The method of claim 17, wherein the optoelectronic device is a wavelength demultiplexer, a wavelength multiplexer, a power splitter, a mode converter, a multi-mode interference coupler, or a many-single-mode coupler.

* * * * *